Jan. 31, 1961 A. B. NEWTON 2,969,788
SOLAR ENERGY COLLECTORS
Filed July 1, 1957
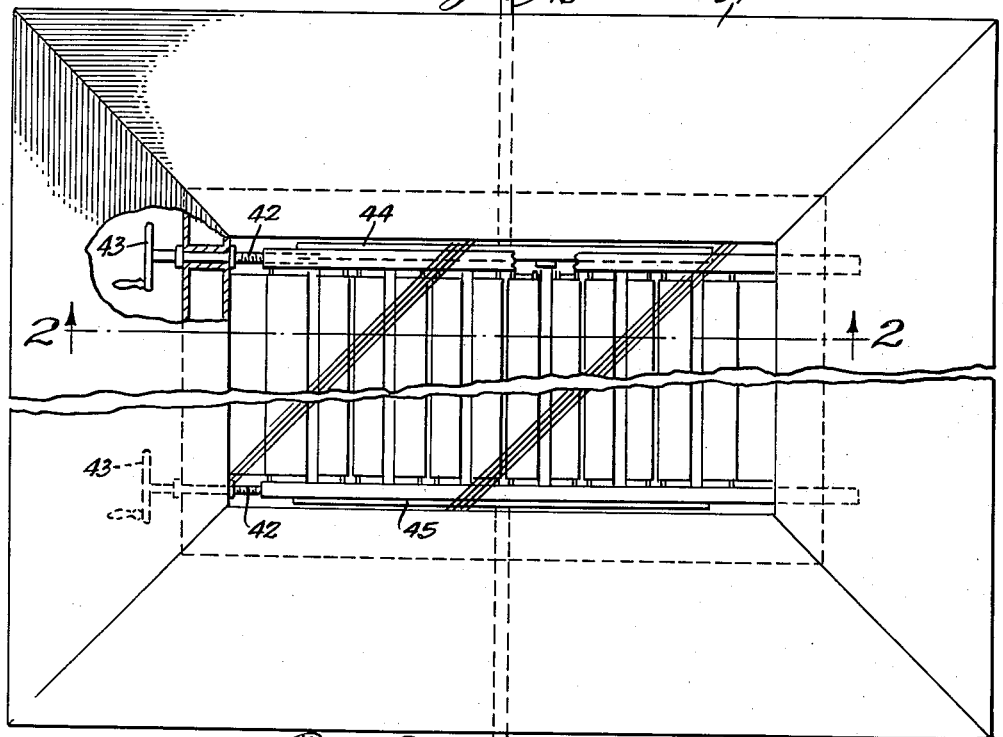
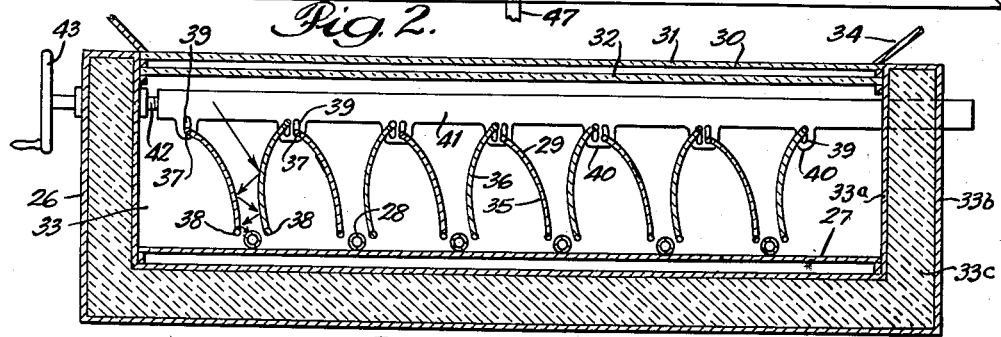
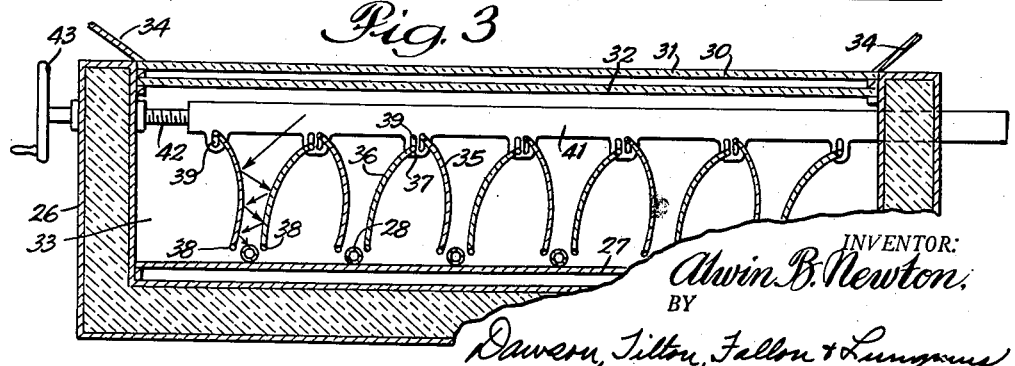
INVENTOR:
Alwin B. Newton
BY
Dawson, Tilton, Fallon & Lungmus,
ATTORNEYS.

United States Patent Office 2,969,788
Patented Jan. 31, 1961

2,969,788
SOLAR ENERGY COLLECTORS

Alwin B. Newton, Wichita, Kans., assignor to The Coleman Company, Inc., Wichita, Kans., a corporation of Kansas Filed July 1, 1957, Ser. No. 669,150

4 Claims. (Cl. 126—271)

This invention relates to high temperature solar energy collectors.

A major defect of present solar energy collectors lies in their failure to develop high enough temperatures to permit efficient utilization of the energy converted by the collectors. For example, where heat from a solar energy collector is intended to be used in developing power, the efficiency of the thermodynamic cycle will depend largely upon the degree of temperature attained. Consequently, the failure of conventional collectors in heating circulating fluids to sufficiently high temperatures results in inefficient operation of the accompanying power units.

Similarly, where heat is to be transferred and stored for later use, it is apparent that the amount of fluid or other material necessary to store a given amount of heat is dependent upon the temperature to which the material is heated. Stated differently, a quantity of heat-retaining material raised to a relatively high temperature may hold as much heat as a larger amount of similar material at a lower temperature. Therefore, in solar energy heating systems, regardless of whether the heat is to be stored or transferred to power means, it is advantageous to provide a solar energy collector which is capable of attaining high temperatures.

Therefore, one of the main objects of the present invention is to overcome the aforementioned defects of present solar energy collectors. Another object is to provide a solar energy collector equipped with means for intensifying and concentrating the sun's rays upon a series of fluid-carrying conduits, so that the fluid within the conduits is heated to a substantially higher temperature than in conventional collectors.

The heat of this fluid may then be stored by the fluid itself, or it may be transferred to some other medium and stored as latent heat. Another object is to provide a solar energy collector having reflectors adapted to concentrate the direct or diffused rays of the sun, and adapted to prevent the escape of heat from other parts of the collector. A still further object is to provide a high temperature solar energy collector having adjustable reflector means adjacent the elements to be heated, the reflectors being adjustable to provide maximum concentration of the sun's rays upon the heating elements throughout the day.

Other objects will appear from the specification and drawings, in which—

Figure 1 is a broken top plan view of a solar energy collector embodying the present invention; Figure 2 is a broken vertical cross section taken along lines 2—2 of Figure 1 and illustrating the adjustable reflectors tilted in one direction; Figure 3 is a cross sectional view similar to Figure 2 but showing the reflectors angled or tilted in a second or opposite direction.

Referring to the drawings, Figures 1–3 show a solar energy collector comprising an enclosure or casing 26, a flat coil-supporting plate 27, fluid carrying tubes 28 and curved reflectors 29. The casing defines a chamber 33 and is equipped with a transparent glass cover 30 composed of a pair of spaced apart glass plates 31 and 32 in order to restrict or retard the dissipation of heat from the chamber. The cover is preferably coated to reduce reflection or is formed from a non-reflective type of glass.

As shown most clearly in Figures 2 and 3, the sides and bottom of casing 26 are double-walled. Between the inner walls 33a and the outer walls 33b is a layer of insulating material 33c. The insulating layer may be composed of any suitable material capable of preventing or retarding the dissipation of heat through casing 26.

If desired, reflecting wings 34 may be mounted on all four sides of casing 26. These wings are angled upwardly and outwardly, and have reflective upper surfaces adapted to reflect direct rays of sun-light upon reflectors 29.

The structure illustrated in the drawings is particularly suitable for a rigid or permanent installation. A rigid mounting of the collector is desirable because it obviates the need for flexible or adjustable piping to and from the unit. However, to obtain maximum collector efficiency at any given time of the day, adjustment means are provided for varying the positions of the reflector elements.

From Figures 2 and 3, it will be seen that each of the reflectors 29 is longitudinally divided to provide a pair of separate side plates 35 and 36. Each of the side plates forms one leg of a V-shaped reflector, and has a highly reflective, convex outer surface and a reflective concave inner surface. The first and last plates of the reflector series are identical in shape and size to the side plates 35 and 36 of the composite reflectors 29.

At the ends of each reflector plate, and adjacent the upper and lower edges thereof, are a pair of outwardly projecting pins or shafts 37 and 38, respectively. Lower pins 38 are rotatably received by openings (not shown) spaced along the lower portion of the inner side walls of the casing. Consequently, the reflector plates are free to pivot about pivotal axes extending along their lower edges. Upper pins 37 are freely carried within the vertically elongated slots 39 provided by the depending tabs 40 of adjustment bars 41.

The adjustment bars are longitudinally slidable within chamber 33 along opposite side walls of casing 26. One end of each bar projects through an opening in one wall of the casing, and is slidably received therein. The opposite end of each bar is equipped with a threaded bore adapted to receive threaded shaft 42. As shown most clearly in Figure 1, the two threaded shafts are journaled in the casing wall, and are freely rotatable with reference thereto. The outer ends of the shafts may be provided with control wheels or handles 43 for rotating the shafts and driving the adjustment bars 41 longitudinally within the casing chamber.

The collector of Figures 1–3 is provided with a series of parallel heat collecting tubes 28 arranged between and below adjacent reflectors 29. Each of the tubes has its opposite end in communication with an inflow manifold 44 and an outflow manifold 45. The manifolds in turn communicate with inflow conduit 46 and outflow conduit 47, respectively. It will be seen, therefore, that this arrangement provides for parallel fluid flow through the heat collecting tubes 28. However, it is to be understood that the series flow arrangement may be substituted for the present fluid flow structure.

For most efficient operation of the solar energy collector, it is desirable to support casing 26 so that the cover 30 is generally perpendicular to the plane defined by the sun's path of travel, during the time of the year when heat collection is desired, i.e., in most cases, during the winter months. Control wheels 43 may then be rotated to shift adjustment arms 41 and pivot the reflector plates 35 and 36 into whatever position produces the greatest concentration of solar radiation on heat collecting tubes 28. For example, in the morning hours, it may be desirable to pivot the reflector plates into the position shown in Figure 2, so that the sun's rays will strike the reflector plates as indicated by the arrows, and will be intensified and concentrated upon the fluid carrying tubes. Later in the day, the reflector plates may be pivoted into the positions shown in Figure 3 to maintain the high concentration of the rays despite the changed position of the sun. It will be understood that shaft 42 may be synchronized for operation by a single control wheel and that, if desired, these shafts may be turned by power means (not shown) to change automatically the positions of the reflectors with reference to the changing position of the sun throughout the day.

The inner concave surfaces of the reflector plates are highly reflective to prevent the escape of heat from tubes 28, and plate 27 is formed of a material having low emissivity so as to reflect heat rays back towards tubes 28 and the undersurfaces of reflectors 35 and 36. Water or other fluid which flows through the heated tubes passes from the collector through outlet conduit 47, and may be used for power or heating means or may be stored in a suitable reservoir for later use. Also, the collector may transfer heat to some other material for latent heat storage. In this connection it will be noted that the present invention permits a greater range of selection of melting materials for latent heat storage because of the relatively high temperatures obtained by the collector.

Reflectors 29 may be formed from polished aluminum sheet material, from stainless steel, or from any other highly reflective and durable material. As shown in Figures 2 and 3, the downwardly diverging side walls of adjacent reflectors define tapered passages leading towards parallel sections of the heat collecting tubes. Sunlight passing downwardly through cover 30 strikes the highly reflective convex surfaces of reflectors 29 and is directed downwardly towards the tubes. As represented by the arrows in Figures 2 and 3, the curvature of the reflectors is developed so that rays striking their outer surfaces are reflected back and forth between adjacent reflectors and are thereby intensified and concentrated upon tubes 28. Consequently, the tubes, which are formed from copper or other heat conductive material, are heated to a considerably higher temperature than the collecting tubes of conventional non-concentrating solar energy collectors.

As tubes 28 are heated by the solar rays reflected and intensified by reflectors 29, some of the heat will be conducted to plate 27 upon which the tubes are mounted. Although plate 27 is a relatively poor heat conductor, its low emissivity in the larger wave length ranges results in the reflection of heat back to the undersides of reflectors 29, and these heat rays will then be reflected back and forth until they strike heat-collecting tubes 28. Below the plate 27 is a dead air space which serves to insulate the plate and prevent heat loss in that direction. Hence, the escape of heat from tubes 28 and from plate 27 is effectively prevented by the opposing reflective surfaces of the plate and the reflectors which re-direct heat rays emanating from the tubes 28 back to those tubes.

A reflector of "developed" shape is herein defined as a reflector having a cross section in the general shape of an inverted V, with its side walls bowed outwardly to provide convex outer surfaces and concave inner surfaces, so that rays striking the outer surfaces of the reflectors will be directed towards the heat carrying tubes disposed between adjacent reflectors. It is apparent that the precise curvature necessary to obtain this result will depend in a large part upon the particular spacing of the heat tubes and the depth of the whole unit.

While in the foregoing I have disclosed an embodiment of the invention in considerable detail for purposes of illustration, it will be understood by those skilled in the art that many of these details may be varied without departing from the spirit and scope of the invention.

I claim:

1. In a high temperature solar energy collector, a casing providing a chamber therein and equipped with a transparent cover for admitting sun-light into said chamber, a series of elongated parallel reflectors mounted within said chamber, said reflectors each comprising a pair of downwardly and outwardly diverging side plates independently mounted upon said casing for pivotal movement about the lower edges thereof and being reflective on opposite surfaces thereof, a plurality of elongated heat collecting tubes each mounted within said casing between the lower edges of the side plates of adjacent reflectors, and means for simultaneously pivoting said plates into selected positions for concentrating solar rays upon said heat collecting tubes.

2. The structure of claim 1 in which a flat plate is mounted within said chamber below said heat collecting tubes and below said reflectors, whereby the reflective inner surfaces of said reflector plates reflect heat rays from said flat plate back towards the same.

3. The structure of claim 1 in which said pivotally mounted reflector plates are provided with convex outer surfaces and concave inner surfaces.

4. A high temperature solar energy collector comprising a casing having a transparent cover and defining a chamber therein, a plurality of elongated parallel reflectors mounted within said chamber, said reflectors each having a generally inverted V-shaped cross section and each having side walls providing reflective convex outer surfaces, and a plurality of elongated heat collecting tubes each being disposed parallel to and between the lower edges of adjacent reflectors, said reflectors extending upwardly above and between said tubes, each of said elongated reflectors being longitudinally divided and being provided with a pair of side walls, each of said side walls being independently and pivotally carried at its ends by said casing, and means for simultaneously pivoting the side walls of all of said reflectors according to the position of the sun, whereby, sun-light striking said reflectors is reflected back and forth between the convex surfaces of adjacent reflectors and is concentrated upon the heat collecting tubes disposed therebetween.

References Cited in the file of this patent

UNITED STATES PATENTS

| | | |
|---|---|---|
| 748,696 | Browning | Jan. 5, 1904 |
| 966,070 | Bailey | Aug. 2, 1910 |
| 980,505 | Emmet | Jan. 3, 1911 |
| 1,074,219 | Skiff | Sept. 30, 1913 |
| 1,201,536 | Whitehead | Oct. 17, 1916 |
| 1,946,184 | Abbot | Feb. 6, 1934 |
| 2,249,642 | Turner | July 15, 1941 |
| 2,293,735 | Hardgrove | Aug. 25, 1942 |
| 2,316,191 | Scott | Apr. 13, 1943 |
| 2,625,930 | Harris | Jan. 20, 1953 |